(12) United States Patent
Ho

(10) Patent No.: US 8,450,973 B2
(45) Date of Patent: May 28, 2013

(54) LITHIUM BATTERY MODULE

(75) Inventor: Chang-Yu Ho, Hsinchu County (TW)

(73) Assignee: Neotec Semiconductor Ltd., Hsin-Chu Hsien (TW)

( * ) Notice: Subject to any disclaimer, the term of this patent is extended or adjusted under 35 U.S.C. 154(b) by 377 days.

(21) Appl. No.: 13/021,089

(22) Filed: Feb. 4, 2011

(65) Prior Publication Data

US 2011/0193527 A1    Aug. 11, 2011

(30) Foreign Application Priority Data

Feb. 9, 2010   (TW) .............................. 99104049 A

(51) Int. Cl.
*H01M 10/46* (2006.01)

(52) U.S. Cl.
USPC ......................................................... 320/119

(58) Field of Classification Search
USPC .................. 320/107, 112, 116, 118, 119, 122
See application file for complete search history.

(56) References Cited

U.S. PATENT DOCUMENTS

2008/0018301 A1 * 1/2008 Morita ......................... 320/119

* cited by examiner

*Primary Examiner* — Edward Tso
(74) *Attorney, Agent, or Firm* — McClure, Qualey & Rodack, LLP

(57) ABSTRACT

A lithium battery module with multiple-cells connected in parallel is disclosed. The lithium battery module comprises a battery management unit, a power converter (optional) and each cell with an individual charging control switch and a discharging control switch in series connected with the cell and is independent controlled by the battery management unit so that a charger is capable of charging the designate cell or more or disable one among them.

19 Claims, 5 Drawing Sheets

LITHIUM BATTERY MODULE

FIELD OF THE INVENTION

The present invention pertains to a battery module, particularly to a battery module assembled by a plurality of cells in parallel connected and each of them can be controlled independently.

DESCRIPTION OF THE PRIOR ART

Battery is knows as a main power for most of probable electric devices. For instance, the mobile phone, notebook, PDA (personal digital assistance), Walkman, etc., all is relied on the battery to provide electrical power. The battery, however, saves only limited electrical capacity. As a probable device is turned on, the charges saved in the battery consumed will sustain. While the residue electrical capacity is not enough to support the probable device work properly, the battery management unit will force the battery stop outputting. The latter represents that the electricity stored in the battery is lower than a critical level. And then the user needs to recharge the battery to replace it with a new one or replenish the charges. For the earth environment and for a long time the average cost are concerned, choosing the rechargeable battery for the probable device as the main power is generally taken.

A user may judge quality of a notebook by the power sustainability of a carried battery thereof. To cater such user's requirements, a single cell is not only generally requested to have high capacity but has more than one cell in a battery module. For instance, a battery module is assembled typically with four, six cells or even more. However, the cells may position different relative to the terminals of the battery module, as a result, the charge consumptions may be different and so does, the chemicals aging of the cells in the battery module may vary, which are anticipated to affect the ability of charging and discharging. All above problems may thus the make the battery management complexity.

Typically, architecture of a conventional battery module 100 includes two cells 110 in parallel as a set and then two or three sets 111, 112, 113 are further connected in series to comply with the voltage and power of the system load, as is shown in FIG. 1.

A battery module 100 is usually assembled by a plurality of cells 110 such as six, including every two cells 110 in parallel connected and then two or three sets 111, 112, 113 are further in series connected to comply with voltage, power, and capacity that a system load required. Please refer to FIG. 1. It shows a lithium battery module 100 further includes a battery management unit 120 and connects to a charger or a system load.

Suppose that a cell has a capacity of 2200 mAh and a voltage of 3.8V. Therefore the battery module may provide a voltage of 11.4V and a capacity of 4400 mAh. The terminals 115, 116 of the battery module 100 are provided for charging and discharging and further two switches 121, 122 are controlled by CO and DO pins of a battery management unit 120 and connected in between the positive terminal of the set 110 and the battery terminal 115. The load may be a charger 200 such as an adapter of a Notebook.

Aforesaid battery module 100 has six cells but controlled by one charging pin CO and one discharge pin DO of the battery management unit 120 only to determine whether the battery module 100 should stop charging or discharging or not. In charging, the voltage of the charging is the sum of voltages of the three sets 111, 112, 113. In discharging, the discharging current is a sum of a set of cells.

In charging, the battery is charged by a CC-CV mode, e.g. in a CC mode, a large constant charging current firstly until a voltage is reaching a first predetermined level, a taper voltage. Thereafter the current is tapered by a constant voltage mode (CV mode) until the current is smaller than a second predetermined level, a taper current. The benefits of the CC-CV charging mode can prevent the battery from overheating when the voltage of the battery approaching saturation.

Based on the battery is assembled by cells in parallel and then in series connected, whether a battery is saturated or not is determined by the taper current of the charger detected. The first predetermined level is determined by two terminals of the battery.

Therefore, the cells to be assembled in a battery have to be the same grade; otherwise, the chemical in a cell 110 among the cells become bad may be detrimental the charge/discharge ability of the whole battery.

An object of the present invention is to overcome above problems.

SUMMARY OF THE INVENTION

The present invention discloses a lithium battery module having cells 110, a battery management unit and an adaptor. The cells regardless the number, are of all in parallel connected and each cell 110 own an independent charging switch and an independent discharging switch controlled by a battery management unit. Therefore, any assigned cell 110 may be charged or discharged while others are disabled. The cells may also be charged or discharged sequentially one after another or charged/discharged simultaneously. Furthermore, any cell if abnormal may at any time be disabled, In a second preferred embodiment, the Li-ion battery module is without a voltage converter. The voltage boosting may be implemented by the system load or charger.

In a third preferred embodiment, each cell in Li-ion battery module has a charging controlled switch so that the control is independent but all cells has a single discharging controlled switches so that the switch is in common. Such a Li-ion battery module is to reduce the cost of the battery management unit. Generally, the charging control for each cell independent is more important than that of for discharging.

In a fourth preferred embodiment, each cell unit comprises a plurality of cells and a second switch so that the charging control is independent and all the cell units are parallel connected.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

As aforementioned conventional techniques, the cells in lithium battery module are connected including in series and in parallel to achieve capacity and terminal voltage demanded by system load. However, in this way an abnormal cell in the lithium battery module may make the overall deterioration during charging and discharging.

The lithium battery module according to the present invention can overcome foregoing said problems. Please refer to FIG. 2A. The cells 110, regardless the number, are of all in parallel connected. For example, the lithium battery module 100 includes six cells 110 are of all in parallel. Each cell 110 has a charging switch 122 operated independently. Therefore, any cell 110 whether good or abnormal may at any time disable, regardless of the battery cell is dynamic using or in a static state.

Figure 1:
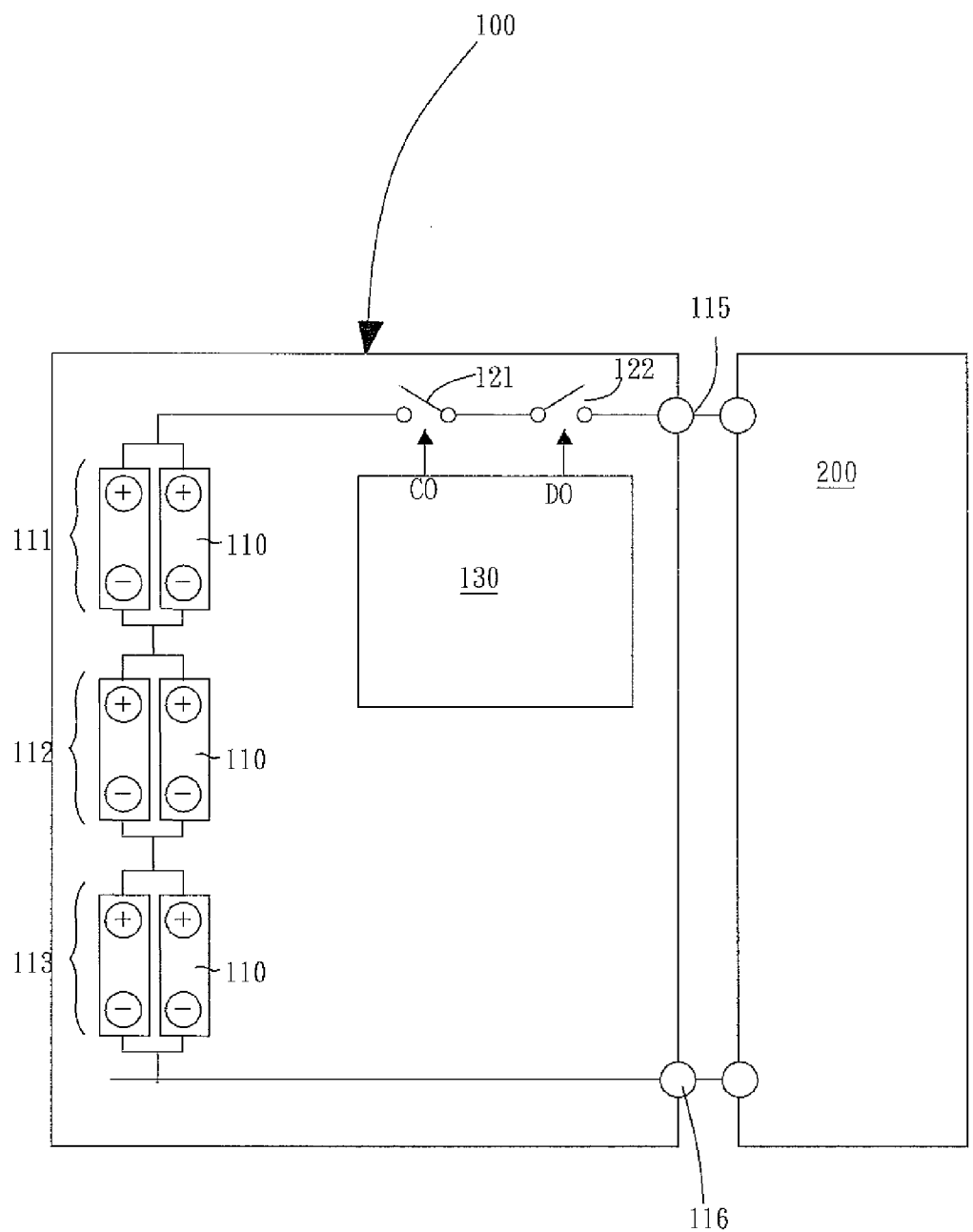
FIG. 1 shows a lithium battery module according to prior art.
Figure 2A:
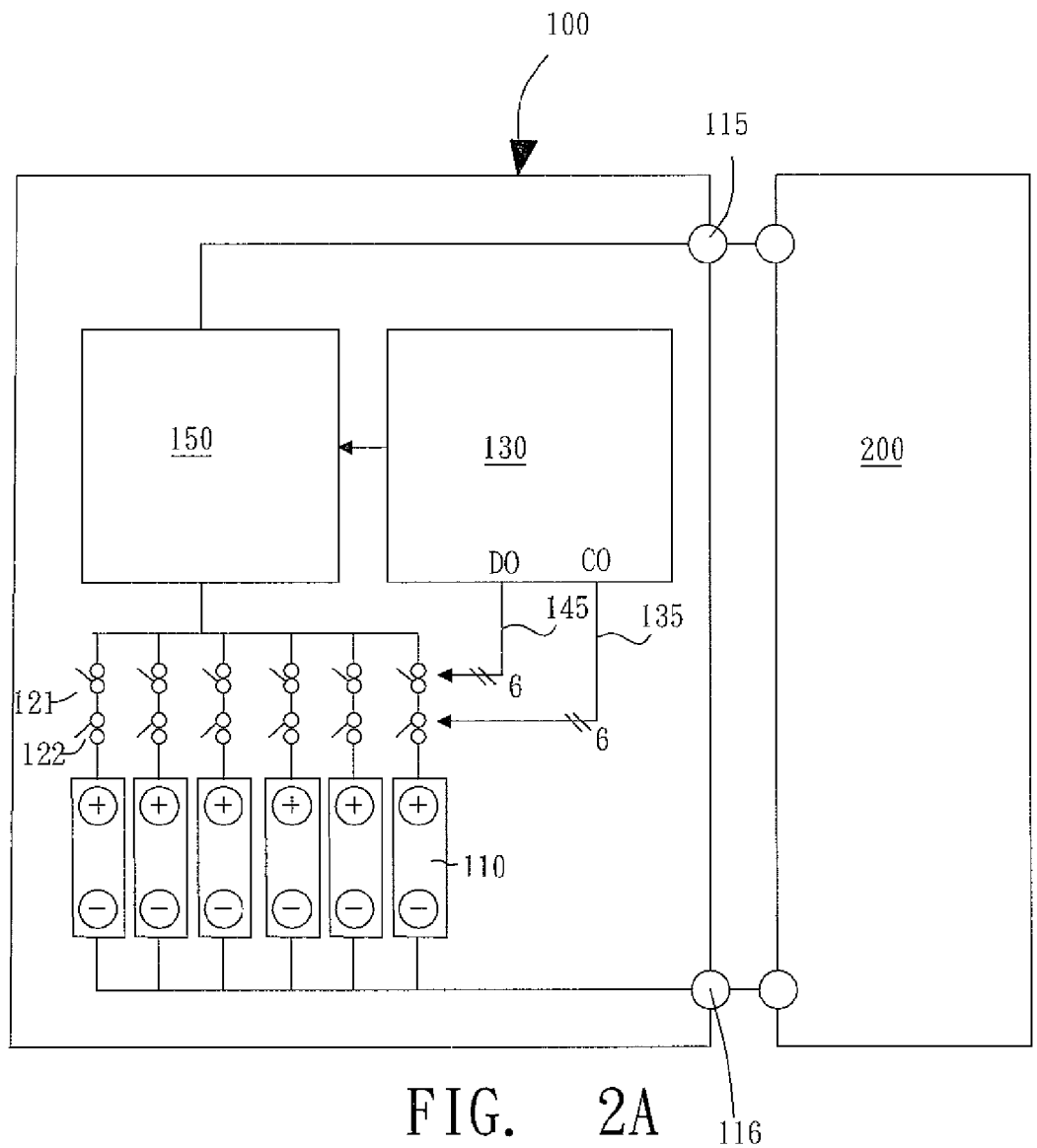
FIG. 2A illustrates architecture of a lithium battery module according to a first preferred embodiment.
Figure 2B:
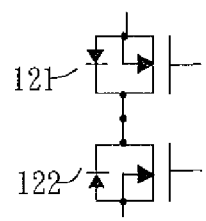
FIG. 2B illustrate the switches are FET transistors with diodes back to back.

Please refer to FIG. 2A, the lithium battery module 100 includes six cells 110 and each has one switch 122 for charging control. The charge control pin 135 CO is not a single pin but a first bus 135 having six conductive lines to provide six output signals, which are, respectively, to control six first switches 122. Similarly, the discharging control DO is a second bus 145, having six conductive lines to provide six control signals to control six second switches 121. The Li-ion battery module 100 has a voltage converter 150 connected in between the second switches 121 and an positive terminal 115 of the lithium battery module 100. The voltage converter 150 or called voltage level shifter will pull the voltage of the battery 110 to comply with a voltage that the system load and/or the charger demands. In FIG. 2A, the first switch 122 and the second switch 121 connected in series as a pair is actually the two field effect transistors, and has two back to back diodes, as shown in FIG. 2B.

While charging, the charger 200 may charge directly to each cell 110 simultaneously. Since for each cell 110 having a independent charging control switch 121, the battery management unit 130 can thus determine individual cell 100 whether be charged or not in accordance with the status of each cell 110. While discharging, the discharge current is equal to the total output current to in parallel cells. Since the output of each cell is independent controlled by one discharging control switch 122, therefore, the battery management unit 130 may disable or enable outputs of any one of cell 100 in accordance with the status of the individual cell 100.

According to a first preferred embodiment of the present invention, the voltage converter 150 can boost the output voltage of the parallel cells 110 to comply with the spec of the system load 200. During a charging phase, the voltage converter 150 push down the voltage output thereof to comply with a spec voltage of a single cell so as to protect the cell.

During a charging phase, a CC-CV (constant current-constant voltage) charge mode is taken. For example, a large constant charging current provided by the charger is used to recharge the battery module until the battery voltage is greater than a first predetermined level, which is a taper voltage before the battery saturation. And then the charging current begins to decrease and keep charger at a constant voltage. The charging current is further decreased until the current less than a second predetermined value. At that time, the battery module is as full charged on. With this charging method, it can avoid the occurrence of overheating caused by a large current charging while the voltage of the battery module approaching a saturation value already.

Different from that of the conventional techniques, the charging mode type for each of the cells 110 does not affect the others that is: when a cell among them 110 with a terminal voltage reaches a first predetermined value, the charging current of the cell 110 taper to the CV mode from the CC mode while the other cells are stilled charged in the CC mode in accordance with the present invention. Furthermore, as the charging current to the cell 100 is further decreasing so that the charging current to the cell 100 is beyond a second predetermined value and then stopping charging. Nevertheless, the others are still in charging without being influence. By contrast, in CC mode or CV mode is determined by the terminal voltage of the battery module rather than a cell in accordance with the prior art.

Since the cells 110 according to the present invention are independently controlled so that a user may use a less power or a regular power and concentrate its power to charge a single cell or charge the cells sequentially, e.g. a first cell and then the second and so on. Thus the user can charge one or a few of cells rapidly.

Any cell 100, no matter good or abnormal can be disabled as necessary. The criteria of a cell whether in normal or abnormal such as internal short is generally judged by measuring the voltage of the cell, to see small variations of the voltage or current versus time such as dV/dt, dI/dt whether lower or higher than a criteria. For example, suppose that an original value is 1 mV/s and the criteria is 30%. thus while the detecting variation is within a range of 0.7~1.3 mV/sec, the cell will be seen as a good one, beyond the range the cell will be judged as bad. While the cells are charging but a bad cell is found and thus the bad cell will be disabled and open its charging loop dynamically and even hot swap.

Figure 3:
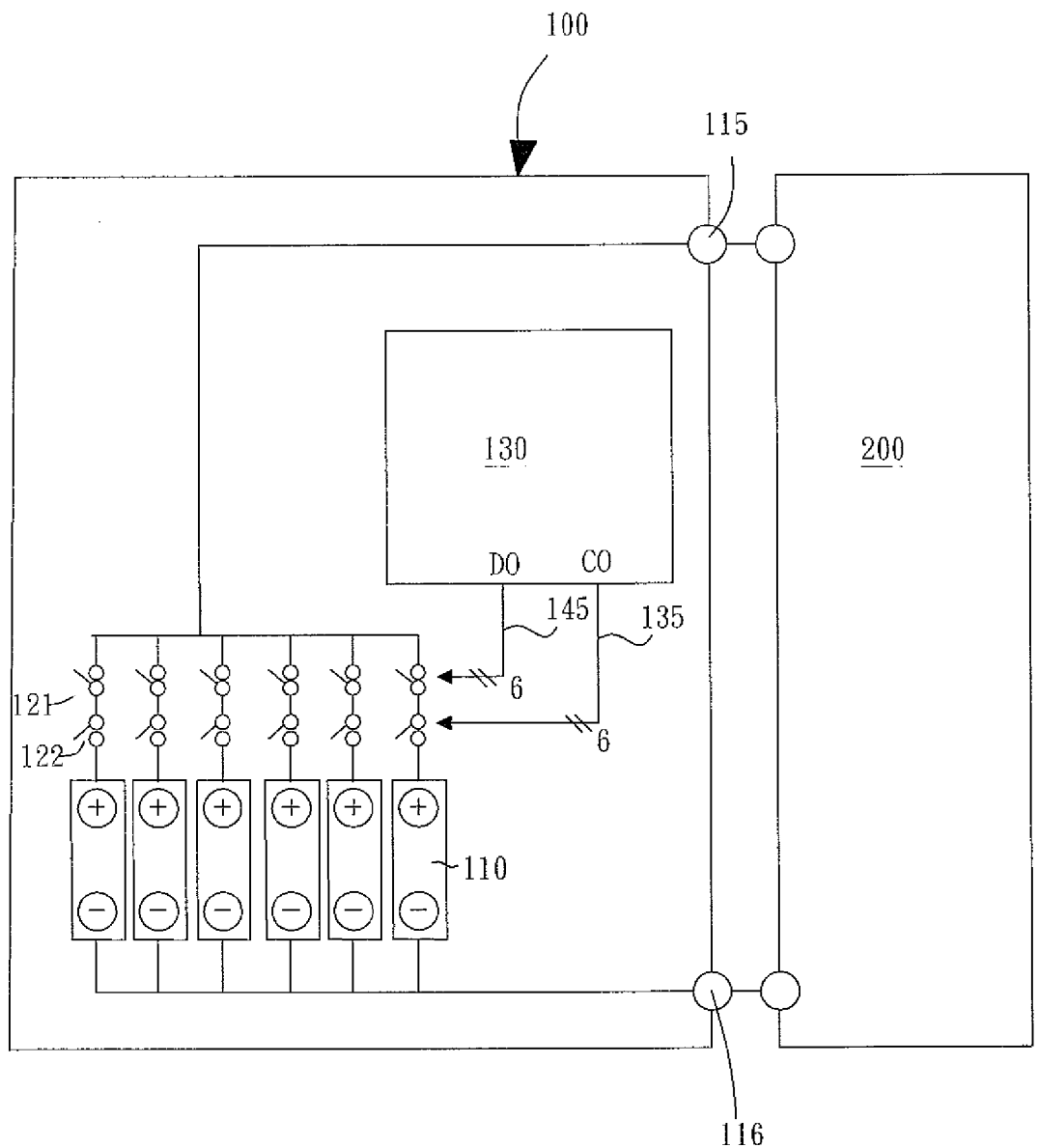
FIG. 3 illustrates architecture of a lithium battery module according to a second preferred embodiment.

According to a second preferred embodiment, please refer to FIG. 3, the function blocks of the lithium battery module 100 are almost the same as the first preferred embodiment except without a voltage converter 150. In this preferred embodiment, the lithium battery module 100 may be charged by a less power or voltage of charger to charge the cells sequentially, i.e., one after another. It thus can charge the individual cell repeatedly.

Since most of the lithium battery module 100 is provided for notebook (NB) use and a popular NB is generally associated with a low core voltage of the central processer unit and the low voltage of the DRAM module. The display adaptor card, USB ports and hard drive may be the devices of NB need a higher voltage. In the case the voltage boost can be implemented by the mother board of NB. A lithium battery module 100 with or without a voltage converter 150 to boost the voltage is thus immaterial.

Figure 4:
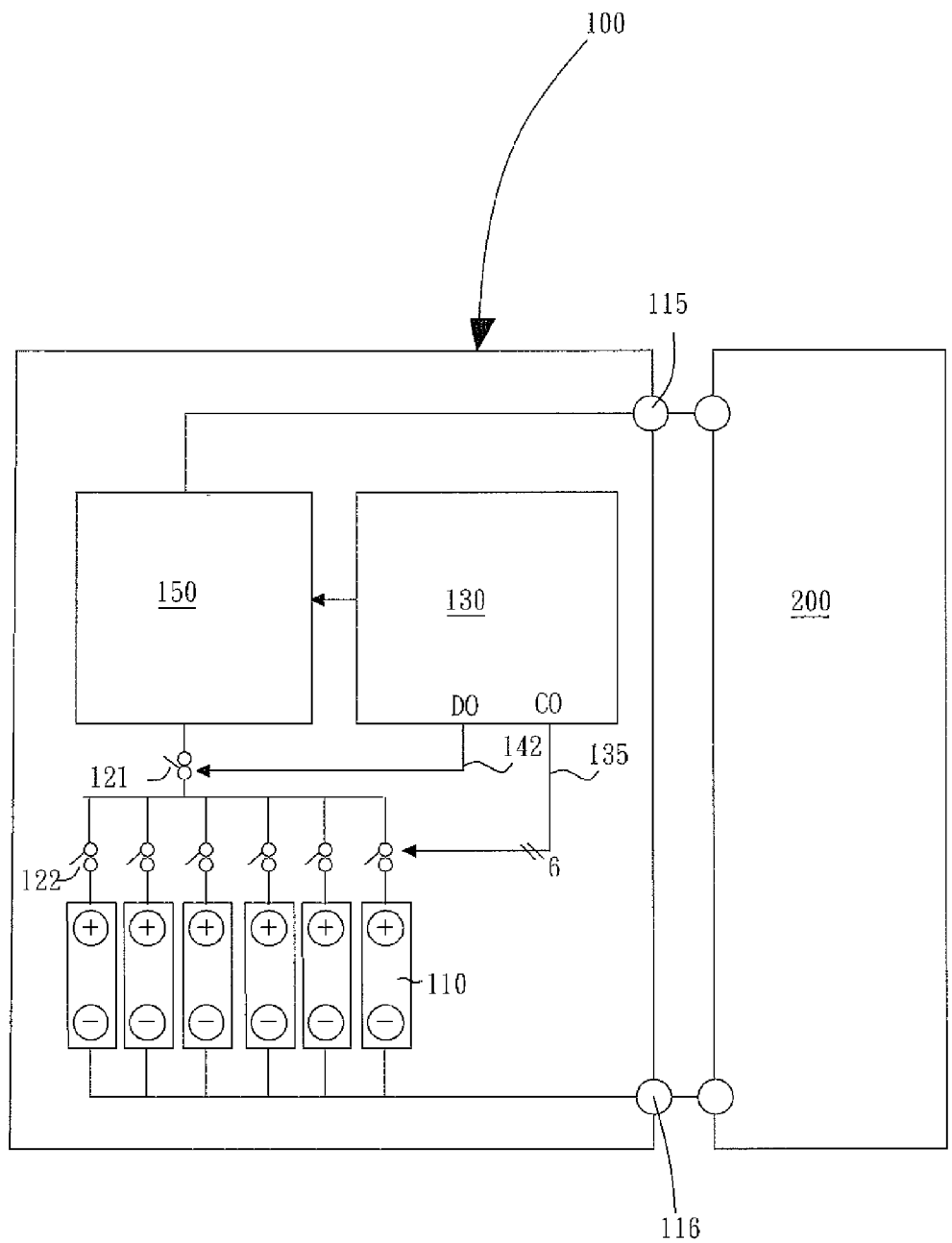
FIG. 4 illustrates architecture of a lithium battery module according to a third preferred embodiment.

Referring to a third preferred embodiment of the present invention, as shown in FIG. 4, the lithium battery module 100 is similar to the first preferred embodiment, except just a single second switch 121. The battery management unit 130 has charging control pins CO through a first bus 135 to control six first switches 122 but a single discharging pin DO through a conductive line 142 to control the second switch 121. The battery management unit 130 may be attracted for some customers since it can indeed cost down. The resulted battery management unit 130 loses the function of discharging control to the cells individually. Even though, the lost is acceptable since the charging control independently is generally more important than that of discharging.

Figure 5:
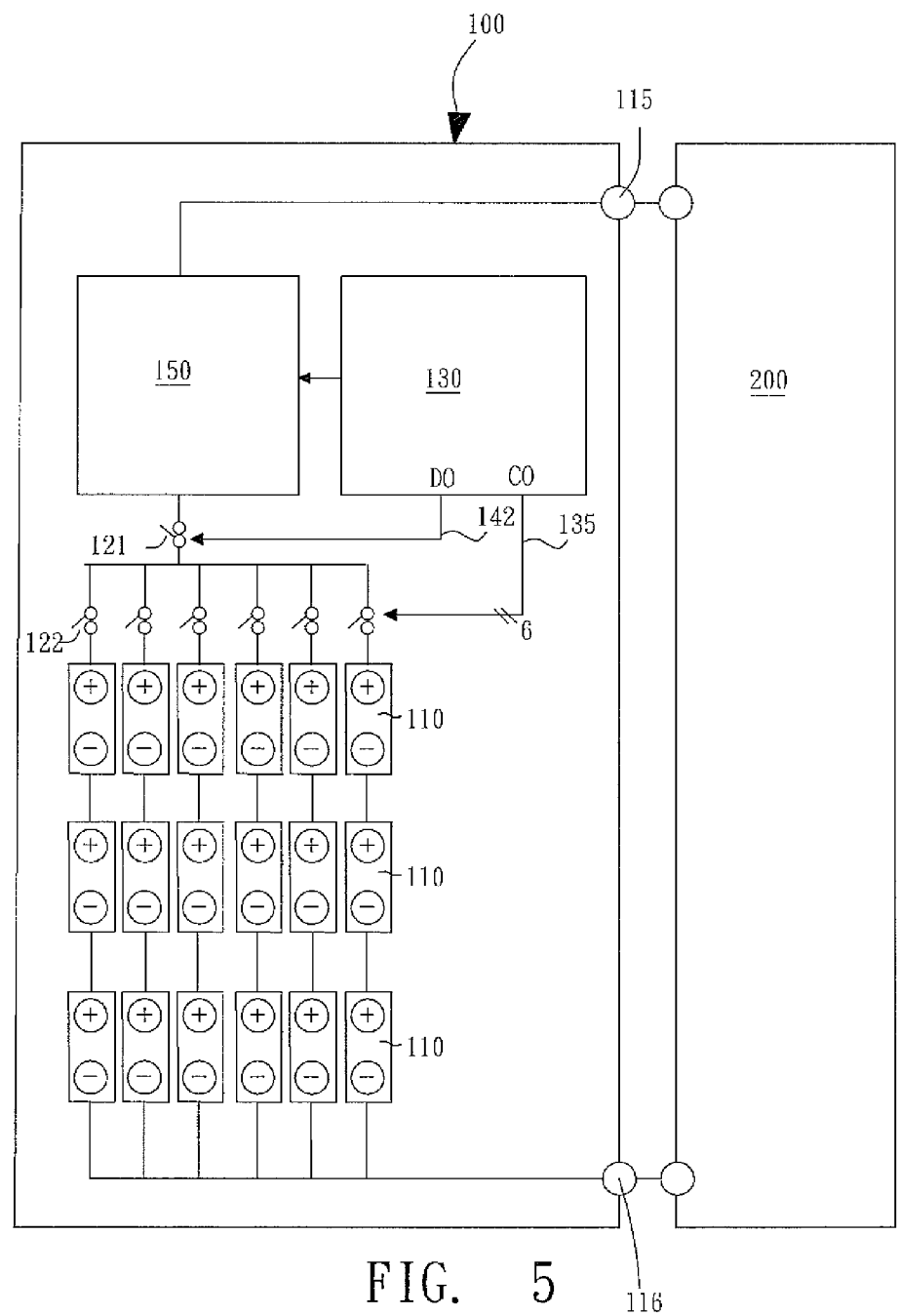
FIG. 5 illustrates architecture of a lithium battery module according to a fourth preferred embodiment.

Referring to a fourth preferred embodiment of the present invention, as shown in FIG. 5, the lithium battery module 100 is similar to that of the third preferred embodiment except that there are three cells under control of the first switch 122 rather than a single cell. The benefits of this preferred embodiment is to increase the capacity and the output voltage of the lithium battery module. The battery charges of each parallel cells still can independently controlled.

The benefits of the present invention are:
(1). The cells assembled in the lithium battery module are in parallel connected and controlled independent. Thus the cells may allow to have different capacities, sizes, or/and chemical material therein and all of them connected in parallel. It is advantage for some NB, e.g. a lithium battery module may include some cells with a large size and the other with a small size so as to utilize any available space. Different capacities of the cells imply different the internal resistors, and further different ends of discharging voltages (7~8% of the capacity or called EDV2) or different charging curves and so on the ending criteria. The facts of independent control cells can tolerant that because each of them can be managed in accordance with the conditions of them.
(2). By contrast, the cells to be selected of the conventional battery module have better with the same capacity, and the same chemical. As the manufacturers of cells are different, the internal resistors may different and thus different EDV2. Therefore, to select the cells, the battery module of the present invention is more flexible.
(3). The system load or charger for the present invention may allow charging focus on a cell with large capacity in the CC mode and then let the cell automatically charging to other cells with small capacity.
(4). The system load or charger for the present invention may allow using a small power charging, or charging the cells, one after another, sequentially. Thus an aim of rapidly charging to reach a target voltage is easily to obtain.
(5). Any one of the cell is, no matter, a good one or a bad, can be disable dynamic or static whenever necessary.
(6). For a small system load, the cells in the battery module can be grouped as two, and each can be charging or discharging in turn.
(7). The cells in the battery module can be hot swap to replace a bad cell with a good. In comparison with the conventional battery module, it must be changed entirely, not a single cell. Thus the battery module according to the present invention can save time and money.
(8). Although the cells of aforementioned embodiments are Li-ion cells, the cells may also be replaced with super capacity.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structures.

What is claimed is:

1. A lithium battery module, comprising:
   a plurality of cell units in parallel connected, each of cell units having a cell, a first switch, and a second switch in series connected;
   a battery management unit having a first bus and a second bus, said first bus through said first switches for charging controls and said second bus through said second switches for discharging controls so that each cell of said cell unit can be charged or discharged individually and independently.

2. The lithium battery module according to claim 1 further comprises a voltage converter connected to a terminal of said cell units to up an output voltage of said cell units to comply with a spec voltage of a system load or a charger.

3. The lithium battery module according to claim 2 wherein said voltage converter further has a function of reducing an output voltage of a charger so as to protect said cells from damage by a high voltage.

4. The lithium battery module according to claim 1 wherein said battery management unit can assign a single cell for charging from said cell units though a first switch and a second switch which are of in series connected with said single cell and disabled others.

5. The lithium battery module according to claim 1 wherein said battery management unit can charge cells of said cell units sequentially, one after another.

6. The lithium battery module according to claim 1 wherein said battery management unit can assign some cells of said cell units for charging.

7. The lithium battery module according to claim 1 wherein said battery management unit can assign some cells of said cell units for discharging and remaining cells disabled.

8. The lithium battery module according to claim 1 wherein said cells do not limit its size, shape, capacity and a combination thereof.

9. The lithium battery module according to claim 1 wherein said each of cell units further comprise a plurality cells in series connected.

10. The lithium battery module according to claim 1 wherein said each of cell units further comprising a super capacitor rather than a Li-ion cell.

11. A lithium battery module, comprising:
    a plurality of cell units in parallel connected, each of cell units having a cell, and a first switch, in series connected;
    a second switch with one terminal connected to a terminal of said cell unit;
    a battery management unit having a first bus and a discharge control pin, said first bus through said first switches for charging controls and said discharge control through said second switch for discharging controls so that each cell of said cell unit can be charged individually and independently.

12. The lithium battery module according to claim 11 further comprises a voltage converter connected to a second terminal of said second switch to up an output voltage of said cell units to comply with a spec voltage of a system load or a charger.

13. The lithium battery module according to claim 11 wherein said voltage converter further has a function of reducing an output voltage of a charger so as to protect said cells from damage by a high voltage.

14. The lithium battery module according to claim 13 wherein said battery management unit can assign a single cell for charging from said cell units though a first switch which is of in series connected with said single cell and disabled others.

15. The lithium battery module according to claim 11 wherein said battery management unit can charge cells of said cell units sequentially, one after another.

16. The lithium battery module according to claim 11 wherein said battery management unit can assign some cells of said cell units for charging.

17. The lithium battery module according to claim 11 wherein said battery management unit can assign some cells of said cell units for discharging and remaining cells disabled.

18. The lithium battery module according to claim 11 wherein said each of cell units further comprise a plurality cells in series connected.

19. The lithium battery module according to claim 11 wherein said each of cell units further comprising a super capacitor rather than a Li-ion cell.

\* \* \* \* \*